(12) United States Patent
Farese et al.

(10) Patent No.: US 8,365,777 B2
(45) Date of Patent: Feb. 5, 2013

(54) COMPRESSOR FILL METHOD AND APPARATUS

(75) Inventors: David John Farese, Riegelsville, PA (US); Joseph Perry Cohen, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1092 days.

(21) Appl. No.: 12/034,284

(22) Filed: Feb. 20, 2008

(65) Prior Publication Data
US 2009/0205745 A1 Aug. 20, 2009

(51) Int. Cl.
*B65B 31/00* (2006.01)
(52) U.S. Cl. .................. 141/4; 141/83; 141/94
(58) Field of Classification Search ............... 141/1, 83, 141/94, 95, 4
See application file for complete search history.

(56) References Cited

U.S. PATENT DOCUMENTS

| | | | |
|---|---|---|---|
| 4,966,206 A | 10/1990 | Baumann et al. | |
| 5,029,622 A | 7/1991 | Mutter | |
| 5,243,821 A | 9/1993 | Schuck et al. | |
| 5,263,826 A | 11/1993 | Baumann et al. | |
| 5,351,726 A | 10/1994 | Diggins | |
| 5,409,046 A * | 4/1995 | Swenson et al. ................ | 141/11 |
| 5,411,374 A | 5/1995 | Gram | |
| 5,454,408 A * | 10/1995 | DiBella et al. ................ | 141/197 |
| 5,458,167 A * | 10/1995 | Schultz et al. ................ | 141/197 |
| 5,551,490 A | 9/1996 | Kountz et al. | |
| 5,570,729 A | 11/1996 | Mutter | |
| 5,694,985 A | 12/1997 | Diggins | |
| 5,771,948 A * | 6/1998 | Kountz et al. ................ | 141/83 |
| 5,810,058 A * | 9/1998 | Kountz et al. ................ | 141/83 |
| 5,832,906 A | 11/1998 | Douville et al. | |
| 5,868,176 A * | 2/1999 | Barajas et al. ................ | 141/83 |
| 5,884,488 A | 3/1999 | Gram et al. | |
| 6,432,283 B1 | 8/2002 | Fairlie et al. | |
| 6,598,624 B2 * | 7/2003 | Togasawa et al. ................ | 141/1 |
| 6,619,336 B2 | 9/2003 | Cohen et al. | |
| 6,672,340 B2 | 1/2004 | Mutter | |
| 6,779,568 B2 * | 8/2004 | Borck ................ | 141/67 |

(Continued)

FOREIGN PATENT DOCUMENTS

DE 196 43 801 B 5/1998
DE 102 18 678 B 11/2002

(Continued)

OTHER PUBLICATIONS

Campbell, K., "Hydrogen Fueling Safety Advances", Presented at the National Hydrogen Association's 14th Annual Hydrogen Meeting, Mar. 4-6, 2003, Washington, DC, pp. 1-10.

*Primary Examiner* — Gregory Huson
*Assistant Examiner* — Nicolas A Arnett
(74) *Attorney, Agent, or Firm* — Keith D. Gourley; Bryan C. Hoke, Jr.

(57) ABSTRACT

A method an apparatus for filling a vessel with compressed gas is disclosed. Gas is compressed into the vessel at a predetermined flow rate using a variable speed pump or compressor. The flow rate is adjusted to increase the gas pressure at a predetermined rate of change. The flow rate is adjusted based upon the instantaneous value of a measured parameter such as gas temperature or pressure or ambient temperature. The parameter is measured by a transducer and the value is fed back to a controller which adjusts the speed of the compressor or pump to produce the flow rate needed to achieve the predetermined pressure rate of change.

18 Claims, 2 Drawing Sheets

U.S. PATENT DOCUMENTS

| | | |
|---|---|---|
| 6,786,245 B1 * | 9/2004 | Eichelberger et al. ............ 141/4 |
| 6,792,981 B1 | 9/2004 | Manning et al. |
| 7,059,364 B2 * | 6/2006 | Kountz et al. ..................... 141/4 |
| 7,152,637 B2 * | 12/2006 | Hoke, Jr. ....................... 141/192 |
| 7,178,565 B2 * | 2/2007 | Eichelberger et al. .......... 141/47 |
| 7,328,726 B2 * | 2/2008 | Cohen et al. ..................... 141/9 |
| 7,490,635 B2 * | 2/2009 | Grabhorn et al. ................ 141/2 |
| 7,500,497 B2 * | 3/2009 | Michel et al. .................... 141/2 |
| 7,568,507 B2 * | 8/2009 | Farese et al. ................... 141/95 |
| 7,866,354 B2 * | 1/2011 | Kanoya et al. ................. 141/95 |
| 7,921,883 B2 * | 4/2011 | Cohen et al. ................... 141/49 |
| 2003/0051486 A1 | 3/2003 | Ursan et al. |
| 2004/0182470 A1 | 9/2004 | White |
| 2006/0180237 A1 * | 8/2006 | Hoke et al. ..................... 141/94 |
| 2007/0028628 A1 | 2/2007 | Chalk et al. |
| 2007/0079892 A1 * | 4/2007 | Cohen et al. ................... 141/105 |
| 2007/0186982 A1 * | 8/2007 | Cohen et al. ................ 137/487.5 |
| 2008/0185068 A1 * | 8/2008 | Cohen et al. ................... 141/94 |

FOREIGN PATENT DOCUMENTS

| | | |
|---|---|---|
| EP | 0 300 222 A1 | 1/1989 |
| EP | 0 356 377 A1 | 2/1990 |
| EP | 0 516 580 A1 | 12/1992 |
| EP | 0 653 585 A1 | 5/1995 |
| EP | 0 770 815 B1 | 5/1997 |
| EP | 1 205 704 A1 | 5/2002 |
| JP | 09-250695 A | 9/1997 |

* cited by examiner

COMPRESSOR FILL METHOD AND APPARATUS

BACKGROUND OF THE INVENTION

This invention relates to an apparatus and a method for filling a vessel, such as a fuel tank, with a compressed gas, such as hydrogen, safely over a minimum period of time without overheating the vessel.

Gaseous hydrogen is expected to supplant liquid hydrocarbon fuels, such as gasoline and diesel, as the fuel of choice for automobiles, trucks and buses due to its obvious environmental advantage. Hydrogen burns cleanly and does not produce greenhouse gases such as CO and $CO_2$ as a combustion by-product.

The practical considerations associated with the large scale storage and dispensing of gaseous hydrogen fuel for motor vehicles presents different problems from those associated with the handling of liquid fuels due to the gaseous nature of the hydrogen. One problem, as yet not satisfactorily addressed, is that of filling fuel tanks of various capacities, different pressures, and different ullage with gaseous hydrogen safely, over a time period comparable with the time required to fill a fuel tank of comparable energy capacity with a liquid fuel.

Safety demands that a tank not be filled too fast to avoid overheating. Additionally, any charging of a tank with compressed gas will cause the gas within the tank to heat up, increasing its pressure, the volume being fixed. The increase in gas temperature and pressure within a tank can prevent the tank from being filled to capacity when the tank is filled to a maximum working pressure. After filling, the heat dissipates to the ambient, cooling the gas and reducing its pressure within the tank. Once cool, the tank can accept more gas (up to its maximum working pressure) requiring that the tank be "topped off" by charging it with additional gas so that it is filled to capacity. Depending upon the rate of fill, the tank may need to be topped off several times before it is completely filled. These steps of filling and cooling are impractical and require too much time compared with filling of a tank with liquid.

BRIEF SUMMARY OF THE INVENTION

The invention concerns a method of filling a vessel with a gas, the method comprising:
(a) compressing the gas into the vessel at a predetermined flow rate;
(b) increasing the gas pressure within the vessel at a predetermined rise rate;
(c) measuring an instantaneous value of a parameter selected from the group consisting of gas pressure, gas temperature, ambient temperature and combinations thereof;
(d) using the value of the parameter to adjust the flow rate of the gas into the vessel to achieve the predetermined rise rate of the gas pressure;
(e) repeating steps (c) and (d) until the vessel is filled with the gas.

In one embodiment, measuring comprises measuring the instantaneous gas pressure within the vessel, the gas pressure within the vessel being used to adjust the flow rate to achieve the predetermined rise rate of the gas pressure within the vessel. In another embodiment, measuring comprises measuring the instantaneous gas temperature within the vessel, the gas temperature within the vessel being used to adjust the flow rate to achieve the predetermined rise rate of the gas pressure within the vessel. In yet another embodiment, measuring comprises measuring the ambient temperature surrounding the vessel, the ambient temperature being used to adjust the flow rate to achieve the predetermined rise rate of the gas pressure within the vessel. In still another embodiment, measuring comprises measuring the temperature of the gas before compressing the gas into the vessel, the temperature of the gas before the compressing into the vessel being used to adjust the flow rate to achieve the predetermined rise rate of the gas pressure within the vessel.

The invention also encompasses an apparatus for filling a vessel with a gas. The apparatus comprises a source of the gas and a compressing means for compressing the gas. The compressing means has a variable mass flow rate and an inlet and an outlet. A first conduit connects the source and the inlet, and a second conduit connects the outlet and the vessel. A controller controls the mass flow rate of the compressing means. A transducer measures the value of a parameter selected from the group consisting of gas pressure, gas temperature, ambient temperature and combinations thereof. The controller receives electrical signals from the transducer and uses the electrical signals to control the mass flow rate of the compressing means to fill the vessel from the source.

DETAILED DESCRIPTION OF THE INVENTION

Figure 1:
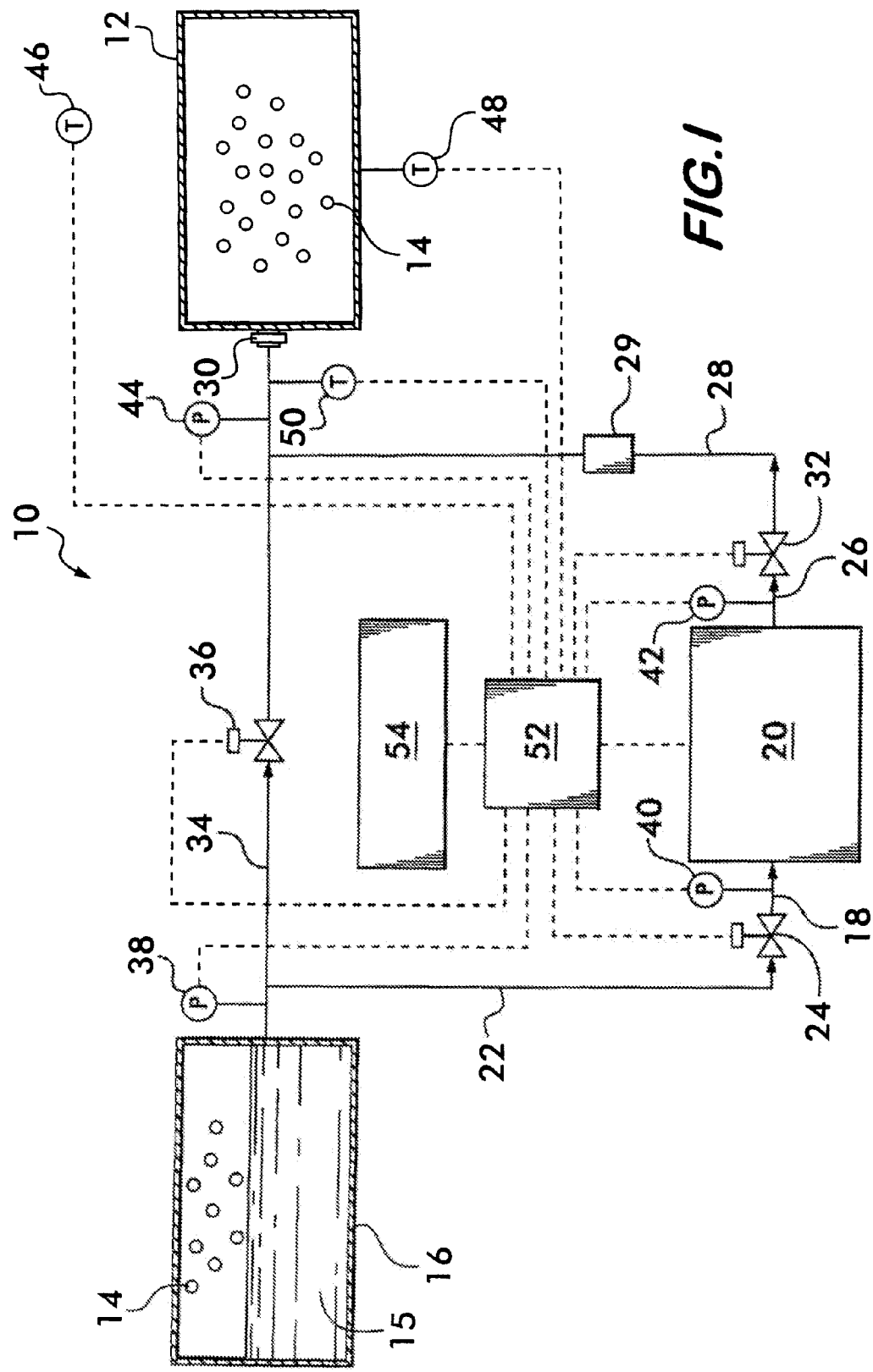
FIG. 1 is a schematic diagram of an apparatus for filling a vessel with a gas according to the invention.

FIG. 1 shows, in schematic form, an apparatus 10 for filling a vessel 12 with a gas 14. Apparatus 10 comprises a source 16 of gas 14. The gas 14 may be stored as a liquid 15 or as the gas 14 at the source. Source 16 is connected in fluid communication with the inlet 18 of a fluid compressing means 20 by a conduit 22. The fluid compressing means 20 may comprise a variable mass flow rate pump or compressor as appropriate depending upon whether a liquid or gaseous fluid is supplied to the inlet 18. A variable mass flow rate compressor or pump may be used for liquids, whereas a variable mass flow rate compressor is used for gas fed to the inlet. The mass flow rate for these pumps and compressors is varied typically by varying the speed of the pump or compressor.

Flow of fluid (liquid 15 or gas 14) from source 16 to the compressing means inlet 18 is controlled by a valve 24 positioned within the conduit 22 between the source and the compressing means. Compressing means 20 has an outlet 26 which may be connected in fluid communication with the vessel 12 using a conduit 28. If liquid 15 is supplied from the compressing means 20 to the conduit 28 then a vaporizer 29 is in fluid communication with the conduit 28 to change the state of the fluid to the gas 14. For practical applications the conduit 28 has a coupling 30 which is sealingly connectable to and disconnectable from the vessel 12. Flow of liquid 15 or gas 14 from the compressing means outlet 26 may be controlled by a valve 32 in the conduit 28. The source 16 may also be connected to the vessel directly using a conduit 34. A valve 36 in the conduit 34 is used to control flow of gas 14 directly from the source 16 to the vessel 12. Note that conduit 34 may share the coupling 30 with conduit 28 for connection to the vessel 12.

The apparatus may comprise one or more pressure and/or temperature transducers, for example, pressure transducer 38 which measures the gas pressure supplied from the source in conduit 22, pressure transducers 40 and 42, which measure the gas pressure at the inlet 18 and outlet 26, respectively, of the compressing means 20, and pressure transducer 44, which measures the gas pressure within conduits 28 and 34 as delivered to the vessel 12. Temperature transducers include transducer 46, which measures the ambient temperature surrounding the vessel 12, transducer 48, which measures the temperature of the gas within the vessel 12, and transducer 50, which measures the temperature of the gas within conduits 28 and 34 before entering vessel 12. Each pressure transducer 38, 40, 42 and 44 generates electrical signals indicative of pressure at their respective measurement points. Similarly the temperature transducers 46, 48 and 50 generate electrical signals indicative of the temperature at their respective measurement points. Note that the transducers need not be located exactly at the point where the measurement is desired, as it is possible to infer the temperature or pressure at a location, for example, within the vessel 12, by measuring the temperature on the outside surface of the vessel, and the pressure in a conduit hydraulically connected to the vessel. It is further understood that every transducer disclosed herein is not necessarily used simultaneously in the apparatus, the exemplary embodiment shown in FIG. 1 illustrates several possible configurations which may have a single transducer or combinations of transducers.

The signals generated by the transducers are transmitted to a controller 52 which is also in communication with valves 24, 32 and 36 as well as the variable flow rate compressing means 20. The controller 52, which may be for example, a programmable logic controller or other microprocessor based device, runs resident software and uses the signals from the transducers in a feed-back loop to open and close the valves and vary the flow rate of the compressing means (for example by varying its speed) according to an algorithm to adjust the flow rate of gas 14 to the vessel 12 to increase the gas pressure within the vessel at a predetermined rate of change as described below. A user interface 54, for example, a keyboard and display monitor, provides communication with the controller permitting the apparatus 10 to be operated to dispense gas from the source to the vessel.

In a practical embodiment the apparatus 10 may serve as a fueling station for dispensing hydrogen fuel to vehicles, the fuel tank comprising the vessel 12. Vehicle tanks have a maximum allowed pressure of about 875 bar. It is desired to maintain the vessel at or below 85° C. to avoid overheating. In such a station the gas source 16 comprises a liquid hydrogen storage tank having a capacity between about 5,700 liters and about 171,000 liters. Hydrogen gas is stored in the reservoir at a pressure between about 0 and about 90 MPa. (Alternately, the gas source 16 may comprise, for example, a steam methane reformer, an electrolysis apparatus or a hydrogen pipeline.) The valves may be pneumatic plug valves which are actuatable by the controller. The pressure transducers may be, for example, piezo-electric transducers. The temperature transducers may comprise thermistors. The compressing means operates to provide a mass flow rate variable between about 0.1 and about 10 kg/min.

Figure 2:
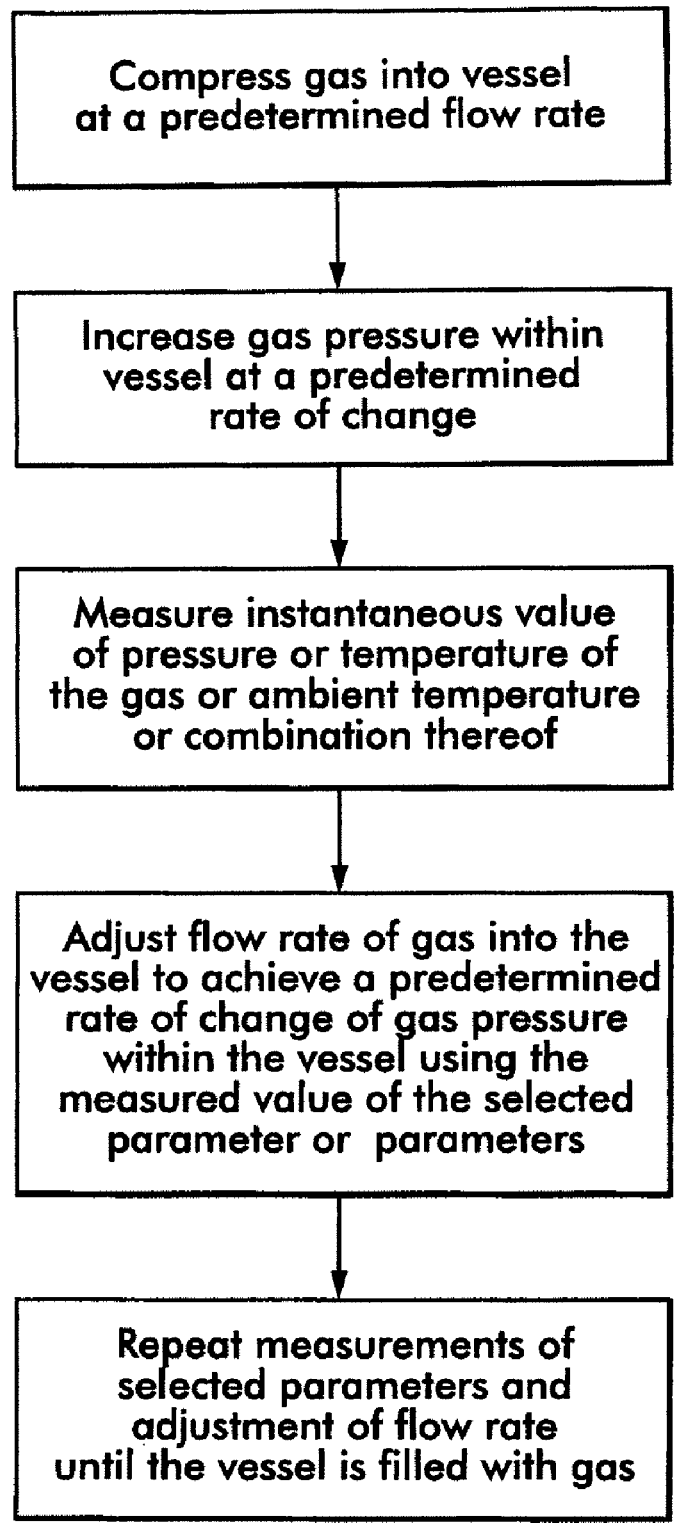
FIG. 2 is a flow chart illustrating a method for filling a vessel with a gas according to the invention.

FIG. 2 provides a flow chart describing an exemplary mode of operation of the apparatus. The exemplary mode described herein assumes the gas 14 is supplied from the source 16. Operation wherein the liquid 15 is supplied from the source is substantially similar to the operation described herein and is not described separately, it being understood that the liquid 15 is eventually vaporized before entering vessel 12.

With reference also to FIG. 1, the coupling 30 is connected to the vessel 12 and a user activates the apparatus with the interface 54. Valve 24 is opened providing gas 14 from the source 16 to the compressing means 20. Valve 32 is opened providing gas from the compressing means to the vessel 12. The compressing means is started and begins compressing gas 14 into vessel 12 at a predetermined flow rate. One or more of the aforementioned transducers measures the instantaneous value of a selected parameter or paramters (pressure or temperature of the gas, or ambient temperature, or combinations thereof) and generates signals indicative of that value or values. The signals are transmitted to the controller 52. Signal transmission, symbolized by the dotted lines in FIG. 1, may be over wires or wirelessly via a radio frequency link. Using the measured values of the parameter or parameters, the controller adjusts the compressing means' flow rate (for example, by adjusting its speed of operation) to increase the gas pressure within the vessel at a predetermined rate of change, known as the pressure rise rate, which will fill the vessel in a predetermined amount of time without overheating the vessel. During filling, the parameter measurements are repeated periodically so that the compressing means' flow rate may be continuously adjusted to take into account the changing pressure within the vessel. The controller halts the flow of gas to the vessel once it is filled to capacity. The valves 24 and 32 are closed and the coupling is disconnected from the vessel.

Various parameters and associated algorithms may be used by the controller to achieve the desired gas pressure change rate within the vessel 12. For example, the gas pressure may be increased at a constant rate. For practical applications, for example for hydrogen gas filling a fuel tank, the constant increase rate may range between about 2.5 MPa/min and about 35 MPa/min. In another algorithm the gas pressure in the vessel increases at an increasing rate. There is also the possibility to increase the pressure at a decreasing rate.

In one embodiment, the controller receives pressure measurements from the pressure transducer 44 which measures values of the gas pressure within the vessel 12. The controller adjusts the compressing means' flow rate using the gas pressure values to achieve and maintain the desired pressure rise rate according to the feedback relationship:

$$\text{Compressing Means' Flow Rate}_{(n+1)} = \text{Compressing Means' Flow Rate}_{(n)} + (\text{Target Pressure Rise Rate} - \text{Measured Pressure Rise Rate}) \times K$$

Wherein:

Compressing Means' Flow Rate$_{(n)}$ is the actual volume flow rate at which the compressor or pump is moving fluid and is proportional to the speed at which a compressor or pump is run during the just completed time interval;

Compressing Means' Flow Rate$_{(n+1)}$ is the actual volume flow rate at which the compressor or pump is moving fluid and is proportional to the speed at which a compressor or pump is run during the next time interval;

Target Pressure Rise Rate is the desired pressure rise rate based on current conditions and filling strategy;

Measured Pressure Rise Rate is the actual pressure rise measured during the just completed time interval; and K is the gain, or the rate at which the controller responds to stimulus.

The compressing means' flow rate may be measured as a mass flow rate in grams/second and the pressure rise rates may be measured in MPa/min. This yields the units associated with the gain K as grams/second per MPa/min for consistency of the functional relationship. The gain K will be specific to a particular apparatus and is determined experimentally consistent with control system practices.

In another embodiment, the controller receives temperature measurements from the temperature transducer 48 which measures values of the gas temperature within the vessel 12. The controller adjusts the compressing means' flow rate using the gas temperature values, for example based upon the functional relation:

When gas temperature within the vessel is less than 65.6° C. the pressure rise rate is maintained at 35 MPa/min; when the gas temperature in the vessel exceeds 65.6° C. the pressure rise rate is reduced according to the formula: pressure rise rate=(85−gas temperature)×0.555.

In another embodiment, the controller receives temperature measurements from the temperature transducer 46 which measures ambient temperature values surrounding the vessel 12. The controller adjusts the compressing means' flow rate using the ambient temperature values, for example based upon the functional relation:

If ambient temperature<15° C. then the pressure rise rate=10 MPa/min; if 15°<ambient temperature<30° C. then the pressure rise rate=7.5 MPa/min; if ambient tempertur>30° C. then pressure rise rate=5 MPa/min.

In another embodiment, the controller receives temperature measurements from the temperature transducer 50 which measures values of the gas temperature before it is compressed into the vessel 12. The controller adjusts the compressing means' flow rate using the gas temperature values, for example based upon the functional relation:

If gas temperature<15° C. then the pressure rise rate=10 MPa/min; if 15°<gas temperature<30° C. then the pressure rise rate=7.5 MPa/min; if gas temperature>30° C. then the pressure rise rate=5 MPa/min.

When the gas source 16 comprises a reservoir of sufficient pressure and capacity, for example at a pressure between about 15 MPa and about 70 MPa and a capacity between about 40 liters and about 1,000 liters, it is feasible to initially fill the vessel 12 by coupling the source 16 directly to the vessel. As shown in FIG. 1, once the coupling 30 is connected to the vessel 12 the controller 52 first opens the valve 36 allowing gas to flow from the source 16 directly to the vessel 12 until the gas pressure within the vessel equalizes with the gas pressure of the source. The controller then closes valve 36 and opens the valves and starts the compressing means as described above to fill the vessel by increasing the gas pressure at a predetermined rate of change.

The method and apparatus according to the invention allows gas vessels to be filled safely and in a reasonable period of time without the fear of overheating and its consequences.

The invention claimed is:

1. A method of filling a vessel with a gas at a predetermined rise rate of gas pressure, said method comprising:
 (a) providing a source of the gas comprising a reservoir, the gas having a pressure ranging from about 15 MPa and about 70 MPa;
 (b) flowing the gas directly from said reservoir into said vessel until the gas pressure within the vessel substantially equalizes with the gas pressure within said reservoir;
 (c) subsequent to the gas pressure within the vessel substantially equalizing with the gas pressure within said reservoir, compressing said gas from said source into said vessel at a flow rate using a compressing means having a variable mass flow rate;
 (d) measuring an instantaneous value of a parameter selected from the group consisting of gas pressure within the vessel, gas temperature within the vessel, gas temperature before compressing said gas into said vessel, ambient temperature surrounding the vessel, and combinations thereof;
 (e) generating electrical signals indicative of the instantaneous value of the parameter;
 (f) transmitting the electrical signals to a controller;
 (g) using the electrical signals to vary the flow rate of the compressing means according to an algorithm used by the controller to adjust said flow rate of said gas into said vessel to achieve said predetermined rise rate of said gas pressure;
 (h) repeating steps (d) through (g) until said vessel is filled with said gas.

2. A method according to claim 1, wherein said predetermined rise rate comprises a constant rate of change.

3. A method according to claim 1, wherein said predetermined rise rate comprises a rate of change that increases at an increasing rate.

4. A method according to claim 1, wherein said predetermined rise rate comprises a rate of change that increases as a decreasing rate.

5. A method according to claim 1, wherein said measuring comprises measuring the instantaneous gas pressure within said vessel, said gas pressure being used to adjust said flow rate to achieve said predetermined rise rate of said gas pressure within said vessel.

6. A method according to claim 5, wherein said flow rate is provided according to the relation: Compressing Means' Flow Rate$_{(n+1)}$=Compressing Means' Flow Rate$_{(n)}$+(Target Pressure Rise Rate−Measured Pressure Rise Rate)×K, wherein K is a gain for a controller.

7. A method according to claim 1, wherein said measuring comprises measuring the instantaneous gas temperature within said vessel, said gas temperature within said vessel being used to adjust said flow rate to achieve said predetermined rise rate of said gas pressure within said vessel.

8. A method according to claim 1, wherein said measuring comprises measuring the ambient temperature surrounding said vessel, said ambient temperature being used to adjust said flow rate to achieve said predetermined rise rate of said gas pressure within said vessel.

9. A method according to claim 8, wherein if said ambient temperature is less than 15° C. then the predetermined rise rate is maintained at 10 MPa/min, and if said ambient temperature is greater than 15° C. and less than 30° C., then the predetermined rise rate is maintained at 7.5 MPa/min, and if said ambient temperature is greater than 30° C. then said predetermined rise rate is maintained at 5 MPa/min.

10. A method according to claim 1, wherein said measuring comprises measuring the temperature of said gas before compressing said gas into said vessel, said temperature of said gas before said compressing into said vessel being used to adjust said flow rate to achieve said predetermined rise rate of said gas pressure within said vessel.

11. A method according to claim 10, wherein if said gas temperature is less than 15° C. then said predetermined rise rate is maintained at 10 MPa/min, and if said gas temperature is greater than 15° C. and less than 30° C. then said predetermined rise rate is maintained at 7.5 MPa/min, and if said gas temperature is greater than 30° C. then said predetermined rise rate is maintained at 5 MPa/min.

12. An apparatus for filling a vessel with a gas, said apparatus comprising:
 a source of said gas; a first valve positioned within a first conduit controlling gas flow between said source and said vessel for allowing gas to flow from the source directly to the vessel until the gas pressure within the vessel equalizes with the gas pressure of the source a compressing means for compressing said gas, said compressing means having a variable mass flow rate and an inlet and an outlet;

a second conduit connected between said source and said inlet;

a third conduit connectable between said outlet and said vessel;

a controller controlling said mass flow rate of said compressing means;

a transducer measuring the value of a parameter selected from the group consisting of gas pressure within the vessel, gas temperature within the vessel, gas temperature before compressing said gas into said vessel, ambient temperature surrounding the vessel, and combinations thereof; wherein said controller receives electrical signals from said transducer, said controller using said electrical signals to control the mass flow rate of said compressing means to increase the gas pressure within the vessel at a predetermined rate of change.

13. An apparatus according to claim 12, further comprising:

a second valve positioned within said second conduit controlling gas flow between said source and said compressing means inlet;

a third valve positioned within said third conduit controlling gas flow between said compressing means outlet and said vessel, said controller controlling said first, second and third valves.

14. An apparatus according to claim 12, wherein said transducer comprises a pressure transducer measuring gas pressure within said vessel.

15. An apparatus according to claim 12, wherein said transducer comprises a temperature transducer measuring gas temperature within said vessel.

16. An apparatus according to claim 12, wherein said transducer comprises a temperature transducer measuring gas temperature before entering said vessel.

17. An apparatus according to claim 12, wherein said transducer comprises a temperature transducer measuring ambient temperature surrounding said vessel.

18. An apparatus according to claim 12, wherein said compressing means is selected from the group consisting of a pump and a compressor.

* * * * *